US012766741B2

(12) United States Patent
Lee et al.

(10) Patent No.: US 12,766,741 B2
(45) Date of Patent: Oct. 20, 2026

(54) SYSTEMS, DEVICES, AND METHODS FOR A ROBOTIC DIGIT AND DETERMINING MOTIONS AND POSITIONS THEREOF

(71) Applicant: Sanctuary Cognitive Systems Corporation, Vancouver (CA)

(72) Inventors: Joshua Lee, Burnaby (CA); Connor Richard Shannon, Vancouver (CA); Kevin Jiaming Wu, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 696 days.

(21) Appl. No.: 18/126,345

(22) Filed: Mar. 24, 2023

(65) Prior Publication Data

US 2023/0302660 A1 Sep. 28, 2023

Related U.S. Application Data

(60) Provisional application No. 63/323,897, filed on Mar. 25, 2022.

(51) Int. Cl.

| | |
|---|---|
| ***B25J 13/08*** | (2006.01) |
| ***B25J 15/08*** | (2006.01) |
| ***G01D 5/165*** | (2006.01) |

(52) U.S. Cl.

CPC ............. *B25J 13/088* (2013.01); *B25J 15/08* (2013.01); *G01D 5/165* (2013.01); *G01D 5/1655* (2013.01)

(58) Field of Classification Search

CPC ....... H01C 10/32; H01C 10/34; H01C 10/345

See application file for complete search history.

(56) References Cited

U.S. PATENT DOCUMENTS 4,921,293 A * 5/1990 Ruoff ....................... A61F 2/583 623/64
4,935,718 A * 6/1990 Yagi ..................... H05K 5/0095 338/170
5,438,516 A * 8/1995 Neubauer ................. B60T 8/00 74/551.8
5,447,403 A * 9/1995 Engler, Jr. ........... B25J 15/0009 294/111
5,847,640 A * 12/1998 Fukaya ................ H01C 10/306 338/322
6,588,288 B1 * 7/2003 Swindler ................ H01C 10/48 338/126

(Continued)

*Primary Examiner* — Kyung S Lee

(74) *Attorney, Agent, or Firm* — Adenike Adebiyi; Thomas Mahon

(57) ABSTRACT

In an implementation, a position transducer includes a printed circuit board (PCB) and a wiper in sliding contact with the PCB. The PCB includes a first and a second connector pad, and a conductive trace comprising two legs. One leg has an end electrically communicatively coupled to the first connector pad, and the other leg has an end electrically communicatively coupled to the second connector pad. The wiper includes a first blade electrically communicatively coupled to the first leg and a second blade electrically communicatively coupled to the second leg. In operation, an electrical path length of a conductive path between the first and the second connector pad depends, at least in part, on a relative position of the PCB and the wiper. One or more of the position transducers can be used to determine a relative position of actuatable components of a robotic digit.

20 Claims, 15 Drawing Sheets

(56) References Cited

U.S. PATENT DOCUMENTS

| | | | | |
|---|---|---|---|---|
| 7,541,911 | B2 * | 6/2009 | Kawaguchi | G01F 23/36 73/317 |
| 7,583,177 | B1 * | 9/2009 | Fan | H01C 10/48 338/162 |
| 7,777,565 | B2 * | 8/2010 | Tanizawa | H03F 3/45928 330/69 |
| 7,889,048 | B2 * | 2/2011 | Owen | G06F 30/367 338/200 |
| 8,182,010 | B2 * | 5/2012 | Lee | B25J 15/0009 294/64.2 |
| 8,704,758 | B1 * | 4/2014 | Figley | G06F 3/0383 345/156 |
| 12,162,138 | B2 * | 12/2024 | Shannon | B25J 15/0023 |
| 12,240,102 | B2 * | 3/2025 | Shannon | B25J 15/0009 |
| 12,263,580 | B2 * | 4/2025 | Shannon | H05K 1/028 |
| 2007/0080774 | A1 * | 4/2007 | Miura | H01C 10/345 338/162 |
| 2011/0163561 | A1 * | 7/2011 | Kim | B25J 9/104 294/111 |

* cited by examiner

SYSTEMS, DEVICES, AND METHODS FOR A ROBOTIC DIGIT AND DETERMINING MOTIONS AND POSITIONS THEREOF

TECHNICAL FIELD

The present systems, devices, and methods generally relate to robotics, and particularly relate to determining motions and positions of robotic digits.

BACKGROUND

Robots are machines that can assist humans or substitute for humans. Robots can be used in diverse applications including construction, manufacturing, monitoring, exploration, learning, and entertainment. Robots can be used in dangerous or uninhabitable environments, for example.

Some robots require user input, and can be operated by humans. Other robots have a degree of autonomy, and can operate, in at least some situations, without human intervention. Some autonomous robots are designed to mimic human behavior. Autonomous robots can be particularly useful in applications where robots are needed to work for an extended time without operator intervention, to navigate within their operating environment, and/or to adapt to changing circumstances.

Robots can be powered by hydraulic power systems, electric motors, and other power sources. Power can be distributed to a robot's components, e.g., actuators. Actuators can be used to convert energy into movement of the robot.

Robots typically have end effectors. Some end effectors include robotic digits. The end effectors of humanoid robots are referred to in the present application as robotic hands and/or robotic feet. The digits of robotic hands are referred to as robotic fingers and/or robotic thumbs. The digits of robotic feet are referred to as robotic toes.

BRIEF SUMMARY

A position transducer may be summarized as comprising a printed circuit board (PCB), the PCB comprising a first connector pad, a second connector pad, and a conductive trace comprising a first leg and a second leg, the first leg having a first end, the first end electrically communicatively coupled to the first connector pad, and the second leg having a second end, the second end electrically communicatively coupled to the second connector pad; and a wiper in sliding contact with the PCB, the wiper comprising a first blade and a second blade, the first blade electrically communicatively coupled to the first leg of the conductive trace, and the second blade electrically communicatively coupled to the second leg of the conductive trace, wherein, in operation, an electrical path length of a conductive path between the first connector pad and the second connector pad depends, at least in part, on a relative position of the PCB and the wiper.

In some implementations, the first leg of the conductive trace includes a first portion, the first portion which electrically communicatively couples the first connector pad to the first blade, and the second leg of the conductive trace includes a second portion, the second portion which electrically communicatively couples the second connector pad to the second blade, wherein the first connector pad, the first portion of the conductive trace, the first blade, the second blade, the second portion of the conductive trace, and the second connector pad form the conductive path.

In some implementations, at least a portion of the second leg of the conductive trace is substantially parallel with at least a portion of the first leg of the conductive trace.

In some implementations, at least a portion of the first leg of the conductive trace is a first curve and at least a portion of the second leg of the conductive trace is a second curve. The second curve may be substantially parallel to the first curve.

In some implementations, at least one of the first blade and the second blade is sprung to maintain the wiper in sliding contact with the PCB.

In some implementations, the position transducer further comprises at least one spring, wherein the at least one spring urges at least one of the first blade and the second blade towards at least one of the first leg and the second leg of the conductive trace, respectively.

In some implementations, the position transducer further comprises an electrical source electrically communicatively coupled to the first and the second connector pad, a meter electrically communicatively coupled to the first and the second connector pad, the meter which, in operation, determines the electrical path length of the conductive path, and a transmitter which, in operation, transmits the relative position of the PCB and the wiper to a controller.

In some implementations, the meter, in operation, determines the electrical path length of the conductive path based at least in part on an electrical resistance of the conductive path.

In some implementations, the conductive trace is a U-shaped conductive trace.

A robotic digit may be summarized as comprising a first joint, the first joint mechanically coupling a first portion of the robotic digit and a second portion of the robotic digit, and a first position transducer, the first position transducer comprising a first printed circuit board (PCB), the first PCB comprising a first connector pad, a second connector pad, and a first conductive trace comprising a first leg and a second leg, the first leg having a first end, the first end electrically communicatively coupled to the first connector pad, and the second leg having a second end, the second end electrically communicatively coupled to the second connector pad; and a first wiper in sliding contact with the first PCB, the first wiper comprising a first blade and a second blade, the first blade electrically communicatively coupled to the first leg of the first conductive trace, and the second blade electrically communicatively coupled to the second leg of the first conductive trace, wherein, in operation, a first electrical path length of a first conductive path between the first connector pad and the second connector pad depends, at least in part, on a relative position of the first PCB and the first wiper.

In some implementations, the first leg of the first conductive trace includes a first portion, the first portion which electrically communicatively couples the first connector pad to the first blade, and the second leg of the first conductive trace includes a second portion, the second portion which electrically communicatively couples the second connector pad to the second blade, wherein the first connector pad, the first portion of the first conductive trace, the first blade, the second blade, the second portion of the first conductive trace, and the second connector pad form the first conductive path.

In some implementations, at least a portion of the second leg of the first conductive trace is substantially parallel with at least a portion of the first leg of the first conductive trace.

In some implementations, at least a portion of the first leg of the first conductive trace is a first curve and at least a portion of the second leg of the first conductive trace is a second curve. The second curve may be substantially parallel to the first curve.

In some implementations, the robotic digit further comprises at least one spring, wherein the at least one spring urges the first blade towards the first leg of the first conductive trace and the second blade towards the second leg of the first conductive trace.

In some implementations, the robotic digit further comprises an electrical source electrically communicatively coupled to the first and the second connector pad, a meter electrically communicatively coupled to the first and the second connector pad, the meter which, in operation, determines the electrical path length of the first conductive path, and a transmitter which, in operation, transmits the relative position of the first PCB and the first wiper to a controller.

In some implementations, the meter, in operation, determines the electrical path length of the first conductive path based at least in part on an electrical resistance of the first conductive path.

In some implementations, the robotic digit is a robotic finger of a robotic hand of a humanoid robot.

In some implementations, the first joint is a knuckle joint.

In some implementations, the relative position of the first PCB and the first wiper includes an angle defining a pitch rotation of the second portion of the robotic digit relative to the first portion of the robotic digit.

In some implementations, the robotic digit further comprises a second position transducer, the second position transducer comprising a second printed circuit board (PCB), the second PCB comprising a third connector pad, a fourth connector pad, and a second conductive trace comprising a third leg and a fourth leg, the third leg having a third end, the third end electrically communicatively coupled to the third connector pad, and the fourth leg having a fourth end, the fourth end electrically communicatively coupled to the fourth connector pad, and a second wiper in sliding contact with the second PCB, the second wiper comprising a third blade and a fourth blade, the third blade electrically communicatively coupled to the third leg of the second conductive trace, and the fourth blade electrically communicatively coupled to the fourth leg of the second conductive trace, wherein, in operation, a second electrical path length of a second conductive path between the third connector pad and the fourth connector pad depends, at least in part, on a relative position of the second PCB and the second wiper. The relative position of the first PCB and the first wiper, and the relative position of the second PCB and the second wiper, may include a first angle defining a pitch rotation of the second portion of the robotic digit relative to the first portion of the robotic digit, and a second angle defining a yaw rotation of the second portion of the robotic digit relative to the first portion of the robotic digit.

In some implementations, the robotic digit further comprises a second joint, the second joint mechanically coupling a third portion of the robotic digit to the second portion of the robotic digit, and a second position transducer, the second position transducer comprising a second printed circuit board (PCB), the second PCB comprising a third connector pad, a fourth connector pad, and a second conductive trace comprising a third leg and a fourth leg, the third leg having a third end, the third end electrically communicatively coupled to the third connector pad, and the fourth leg having a fourth end, the fourth end electrically communicatively coupled to the fourth connector pad, and a second wiper in sliding contact with the second PCB, the second wiper comprising a third blade and a fourth blade, the third blade electrically communicatively coupled to the third leg of the second conductive trace, and the fourth blade electrically communicatively coupled to the fourth leg of the second conductive trace, wherein, in operation, a second electrical path length of a second conductive path between the third connector pad and the fourth connector pad depends, at least in part, on a relative position of the second PCB and the second wiper. The relative position of the second PCB and the second wiper may include an angle defining a pitch rotation of the third portion of the robotic digit relative to the second portion of the robotic digit. The third leg of the second conductive trace may include a third portion, the third portion which electrically communicatively couples the third connector pad to the third blade, and the fourth leg of the second conductive trace may include a fourth portion, the fourth portion which electrically communicatively couples the fourth connector pad to the fourth blade, wherein the third connector pad, the third portion of the second conductive trace, the third blade, the fourth blade, the fourth portion of the second conductive trace, and the fourth connector pad form the second conductive path.

At least a portion of the second leg of the first conductive trace may be substantially parallel to at least a portion of the first leg of the first conductive trace. At least a portion of the first leg of the first conductive trace may be a first curve and at least a portion of the second leg of the first conductive trace may be a second curve. The second curve may be substantially parallel to the first curve. At least one of the first conductive trace and the second conductive trace may be a U-shaped conductive trace.

In some implementations, the first conductive trace is a U-shaped conductive trace.

A robotic end effector may be summarized as comprising a first robotic digit, the first robotic digit comprising a first joint, the first joint mechanically coupling a first portion of the first robotic digit and a second portion of the first robotic digit, and a first position transducer, the first position transducer comprising a first printed circuit board (PCB), the first PCB comprising a first connector pad, a second connector pad, and a first conductive trace comprising a first leg and a second leg, the first leg having a first end, the first end electrically communicatively coupled to the first connector pad, and the second leg having a second end, the second end electrically communicatively coupled to the second connector pad, and a first wiper in sliding contact with the first PCB, the first wiper comprising a first blade and a second blade, the first blade electrically communicatively coupled to the first leg of the first conductive trace, and the second blade electrically communicatively coupled to the second leg of the first conductive trace, wherein, in operation, a first electrical path length of a first conductive path between the first connector pad and the second connector pad depends, at least in part, on a relative position of the first PCB and the first wiper, and a second robotic digit, the second robotic digit comprising a second joint, the second joint mechanically coupling a first portion of the second robotic digit and a second portion of the second robotic digit, and a second position transducer, the second position transducer comprising a second printed circuit board (PCB), the second PCB comprising a third connector pad, a fourth connector pad, and a second conductive trace comprising a third leg and a fourth leg, the third leg having a third end, the third end electrically communicatively coupled to the third connector pad, and the fourth leg having a fourth end, the fourth end electrically communicatively coupled to the fourth connector pad, and a second wiper in sliding contact with the second PCB, the second wiper comprising a third blade and a fourth blade, the third blade electrically communicatively coupled to the third leg of the second conductive trace, and the fourth blade electrically communicatively coupled to the fourth leg of the second conductive trace, wherein, in operation, a second electrical path length of a second conductive path between the third connector pad and the fourth connector pad depends, at least in part, on a relative position of the second PCB and the second wiper.

In some implementations, the first leg of the first conductive trace includes a first portion, the first portion which electrically communicatively couples the first connector pad to the first blade, and the second leg of the first conductive trace includes a second portion, the second portion which electrically communicatively couples the second connector pad to the second blade, wherein the first connector pad, the first portion of the first conductive trace, the first blade, the second blade, the second portion of the first conductive trace, and the second connector pad form the first conductive path.

In some implementations, at least a portion of the second leg of the first conductive trace is substantially parallel with at least a portion of the first leg of the first conductive trace.

In some implementations, at least a portion of the first leg of the first conductive trace is a first curve and at least a portion of the second leg of the first conductive trace is a second curve. The second curve may substantially parallel to the first curve.

In some implementations, at least one of the first blade and the second blade is sprung to maintain the first wiper in sliding contact with the first PCB.

In some implementations, the robotic end effector further comprises at least one spring, wherein the at least one spring urges at least one of the first blade and the second blade towards at least one of the first leg and the second leg of the first conductive trace, respectively.

In some implementations, the robotic end effector further comprises an electrical source electrically communicatively coupled to the first and the second connector pad, a meter electrically communicatively coupled to the first and the second connector pad, the meter which, in operation, determines the first electrical path length of the first conductive path, and a transmitter which, in operation, transmits the relative position of the first PCB and the first wiper to a controller.

In some implementations, the meter, in operation, determines the first electrical path length of the first conductive path based at least in part on an electrical resistance of the first conductive path.

In some implementations, the first conductive trace is a U-shaped conductive trace.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1A:
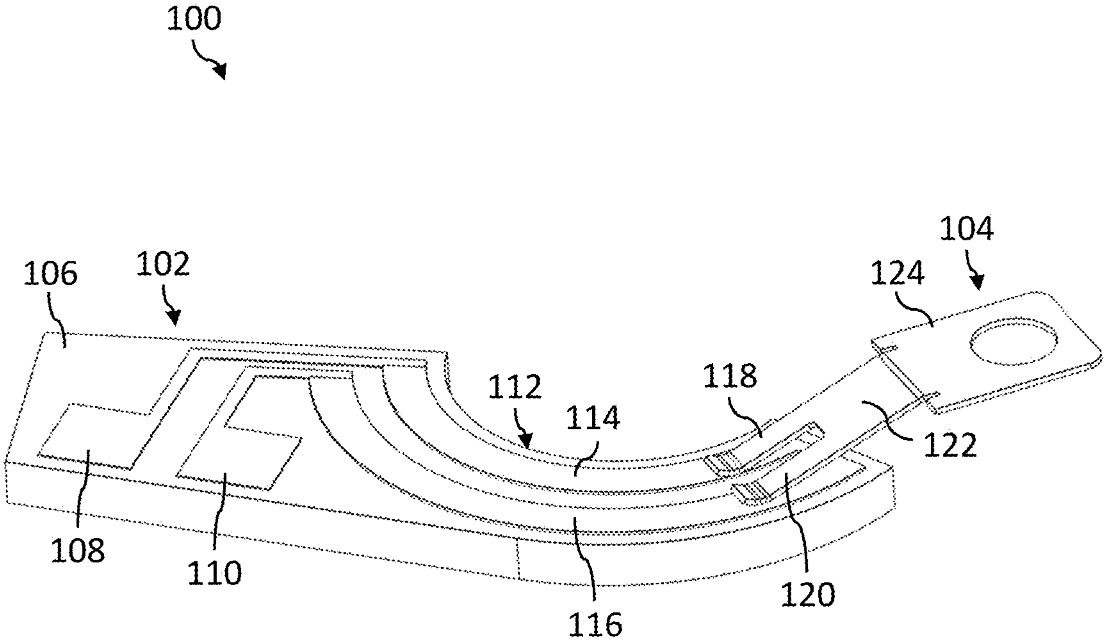
FIG. 1A is a schematic drawing of an example implementation of a position transducer, in accordance with the present systems, devices, and methods.

The following description sets forth specific details in order to illustrate and provide an understanding of various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

A robot may include one or more sensors. Some sensors can be used to sense the external environment, for example, to see or to hear objects in the external environment, or to sense a physical property of the external environment such as temperature or pressure. Some sensors can be used to sense information about the robot itself, for example, where it is, how fast it is moving, where is one part of the robot relative to another, and so forth.

A robot may include one or more actuators, and physically actuatable components that can be moved under the control of the robot, a pilot, and/or a control system. Actuators may be linear or rotary. Some actuators are hydraulic, and convert movement of a piston into linear or rotary motion. Some actuators are pneumatic, and use compressed air to produce movement. Some actuators are electric, and convert AC or DC electric energy into linear or rotary motion.

It can be advantageous for a robot to be able to sense where its actuatable components are in relation to each other and to other parts of the robot. Knowing the relative position of actuatable components can be useful in controlling parts of the robot, e.g., in controlling end effectors and their digits.

The technology described below includes a position transducer integrated with elements of an end effector, e.g., integrated with a knuckle joint in a robotic digit. Multiple position transducers can be integrated with a) a single knuckle joint, b) multiple joints in a single robotic digit, and/or c) multiple digits of an end effector. Data from multiple integrated position transducers can be used to determine relative positions of elements of the end effector, including pitch and yaw orientations of phalanges on either side of a knuckle joint.

The technology described below includes space-efficient ways to determine more precisely the relative positions of phalanges in a robotic digit. The relative positions can be transmitted to a controller in the robot or to an external controller. The technology can advantageously support the control and performance of a robot's dexterous hands, for example, in situations where a robot is tasked with grasping objects in its external environment that have different form factors.

FIG. 1A is a schematic drawing of an example implementation of a position transducer 100, in accordance with the present systems, devices, and methods. Position transducer 100 includes a printed circuit board (PCB) 102, and a wiper 104.

PCB 102 includes a non-conductive substrate 106. Substrate 106 may include FR-2 (a phenolic paper or a phenolic cotton paper, impregnated with a phenol formaldehyde resin) and/or FR-4 (a woven fiberglass cloth impregnated with an epoxy resin), for example.

PCB 102 includes conductive connector pads 108 and 110. PCB 102 also includes a U-shaped conductive trace 112 which includes conductive legs 114 and 116. Connector pads 108 and 110, and U-shaped conductive trace 112 (including conductive legs 114 and 116) may, for example, include copper or copper nickel.

Wiper 104 includes blades 118 and 120, a body 122, and an attachment 124. Wiper 104 is in sliding contact with PCB 102, the contact being between blade 118 and conductive leg 114 of U-shaped conductive trace 112, and between blade 120 and conductive leg 116 of U-shaped conductive trace 112. Blades 118 and 120, and body 122 may, for example, include a conductive metal or metal alloy. Blades 118 and 120, and body 122 may, for example, include copper, copper nickel, or a noble metal alloy.

Connector pad 108, conductive leg 114, blade 118, wiper body 122, blade 120, conductive leg 116, and connector pad 110 form an electrically conductive path between a connection electrically communicatively coupled to connector pad 108 and a connection electrically communicatively coupled to connector pad 110. The connection electrically communicatively coupled to connector pad 108 may be an input signal. The connection electrically communicatively coupled to connector pad 110 may be an output signal. An electric current may travel from connector pad 108, along conductive leg 114, up blade 118, across body 122, down blade 120, and along conductive leg 116 to connector pad 110.

At least a portion of each of conductive legs 114 and 116 may be a respective curve. In at least a portion of conductive leg 116, the curve of conductive leg 116 may be at least substantially parallel to at least a portion of the curve of conductive leg 114. The curves of conductive legs 114 and 116 may be selected to be substantially parallel to one another so that blades 118 and 120 remain in contact with conductive legs 114 and 116, respectively, over a range of motion of wiper 104 relative to PCB 102. Blades 118 and 120 can remain in contact with conductive legs 114 and 116 over the range of motion of wiper 104 relative to PCB 102 provided conductive legs 114 and 116 maintain a separation that matches a separation between blades 118 and 120. Typically, conductive legs 114 and 116 are substantially parallel to one another, and remain in contact with blades 118 and 120, respectively, if a difference in a normal distance between the curves of conductive legs 114 and 116 is less than 10% of the average normal distance between the curves of conductive legs 114 and 116.

Conductive legs 114 and 116 may be separated from one another by a portion of substrate 106. In one implementation, conductive legs 114 and 116 are separated from one another by a portion of substrate 106 having a width approximately equal to a width of conductive leg 114 and/or conductive leg 116.

In some implementations, blades 118 and 120 are urged against conductive legs 114 and 116, respectively. Blades 118 and 120 may be sprung so as to urge blades 118 and 120 against conductive legs 114 and 116. The urging may be caused by a spring (not shown in FIG. 1A).

Position transducer 100 is an example of a potentiometer. In operation of position transducer 100, PCB 102 and wiper 104 slide against one another, and the electrical path length of the electrically conductive path described above depends, at least in part, on a relative position of PCB 102 and wiper 104. For example, when the relative position of PCB 102 and wiper 104 is such that blades 118 and 120 contact conductive legs 114 and 116 closer to connector pads 108 and 110, the electrical path is shorter.

As described below with reference to FIGS. 3A, 3B, 4A, 4B, 5, 6, 7A, 7B, and 7C, position transducer 100 can be used to determine relative positions of two phalanges at a knuckle joint, for example. Signals from one or more instances of position transducer 100, suitably placed on a robotic digit, can be used to determine a bending of the digit at one or more knuckle joints. When two phalanges pivot at a knuckle joint, blades 118 and 120 slide along conductive legs 114 and 116, respectively, while maintaining electrical contact. The change in position of contact points between blades 118 and 120, and conductive legs 114 and 116, respectively, can cause a change in the electrical path length between connector pads 108 and 110. The change in the electrical path length can cause a commensurate change in electrical resistance. In this way, the relative positions of the two phalanges can be encoded in different resistance values.

In some implementations, the signal is a 3 V or 5 V signal. In some implementations, an electrical path traversing U-shaped connective trace 112 has a resistance of about 19 kΩ. In some implementations, an electrical path between connector pads 108 and 110, when the robotic digit is in a resting position, has a resistance of about 16 kΩ.

Figure 1B:
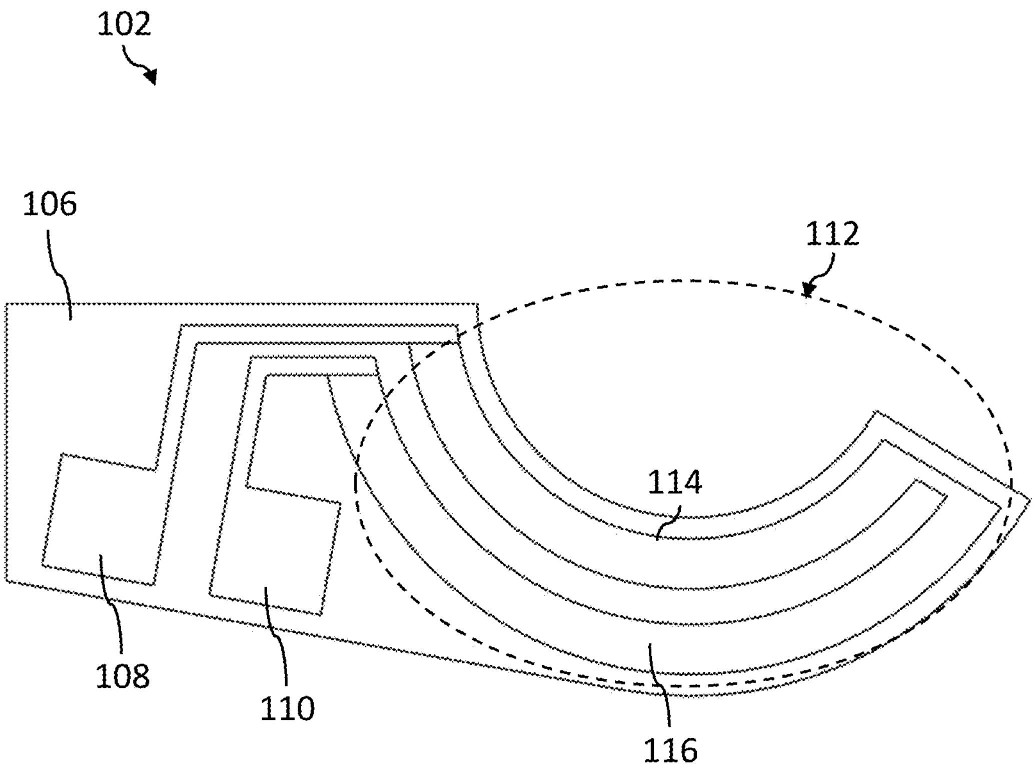
FIG. 1B is a schematic drawing of the printed circuit board (PCB) of the position transducer of FIG. 1A, in accordance with the present systems, devices, and methods.

FIG. 1B is a schematic drawing of printed circuit board (PCB) 102 of position transducer 100 of FIG. 1A, in accordance with the present systems, devices, and method. PCB 102 includes substrate 106, connector pads 108 and 110, and U-shaped conductive trace 112. Conductive trace 112 includes conductive legs 114 and 116.

Position transducer of FIG. 1A (including PCB 102 of FIGS. 1A and 1B, and wiper 104 of FIG. 1A) is an example of a geometry that can be accommodated in a metacarpophalangeal (MCP) joint of a humanoid robotic digit.

A position determination system that includes position transducer 100 of FIG. 1A, in accordance with the present systems, devices, and methods, also includes an electrical source, a meter, and a transmitter. The electrical source provides an electrical signal to position transducer 100. The meter determines an electrical path length in position transducer 100. The transmitter transmits the electrical path length and/or positional data (e.g., a relative position of PCB 102 and wiper 104 of position transducer 100 of FIG. 1A) to a controller. The controller may include one or more processors.

Figure 2A:
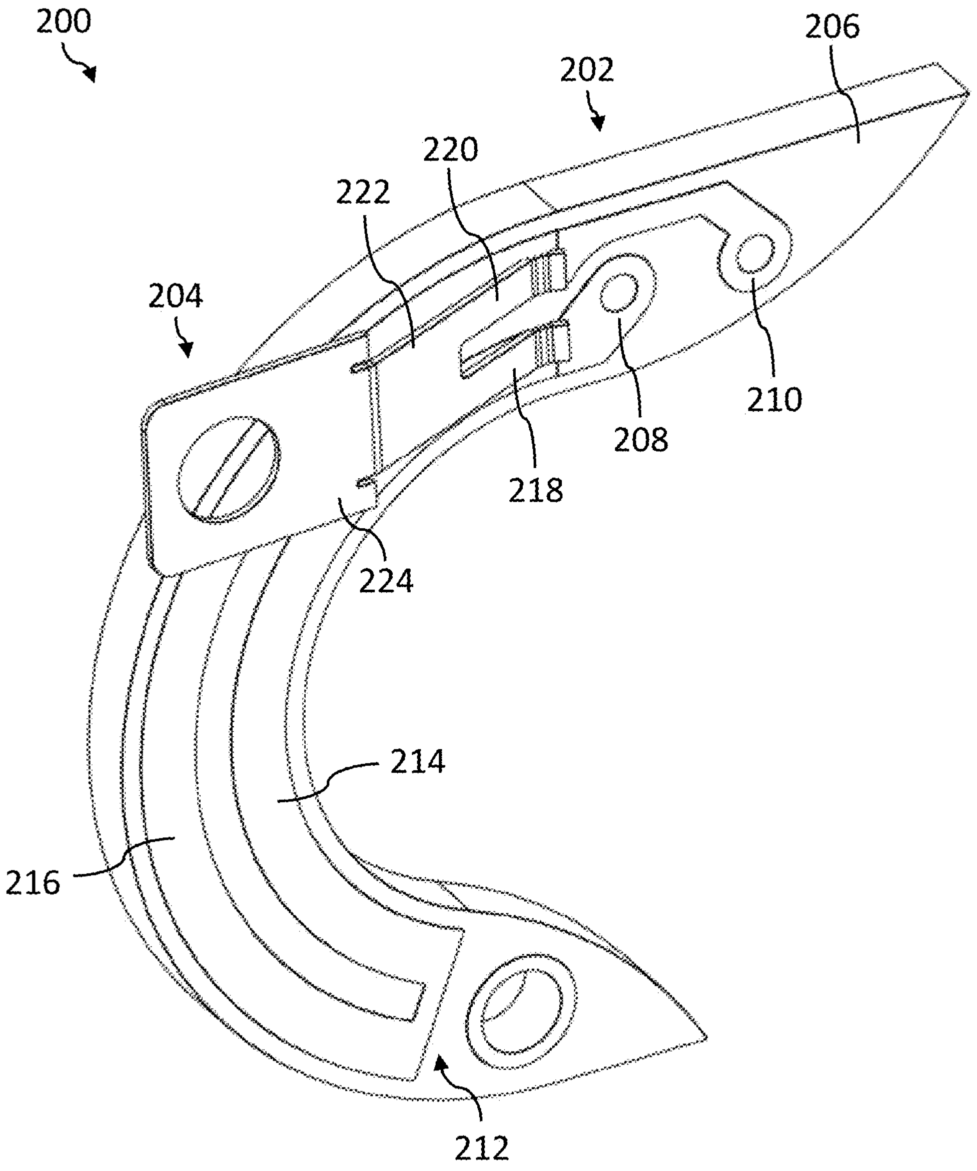
FIG. 2A is a schematic drawing of another example implementation of a position transducer, in accordance with the present systems, devices, and methods.

FIG. 2A is a schematic drawing of another example implementation of a position transducer, in accordance with the present systems, devices, and methods. Position transducer 200 includes a printed circuit board (PCB) 202, and a wiper 204. Position transducer 200 (including PCB 202 and wiper 204) is an example of a geometry that can be accommodated in a proximal interphalangeal (PIP) joint of a humanoid robotic digit.

The elements of position transducer 200 are similar to the elements of position transducer 100 of FIG. 1. The elements of position transducer 100 of FIG. 1 were described in detail with reference to FIG. 1. Position transducers 100 and 200 differ in shape and may differ in size.

PCB 202 includes a non-conductive substrate 206, conductive connector pads 208 and 210, a U-shaped conductive trace 212 which includes conductive legs 214 and 216. Wiper 204 includes blades 218 and 220, a body 222, and an attachment 224. Wiper 204 is in sliding contact with PCB 202, the contact being between blade 218 and conductive leg 214 of U-shaped conductive trace 212, and between blade 220 and conductive leg 216 of U-shaped conductive trace 212.

As described above with reference to position transducer 100 of FIG. 1A, position transducer 200 can be used to determine relative positions of two phalanges at a knuckle joint, for example. Relative motion of PCB 202 and wiper 204 can cause a change in an electrical path length between connector pads 208 and 210, and the change in the electrical path length can cause a commensurate change in electrical resistance.

Figure 2B:
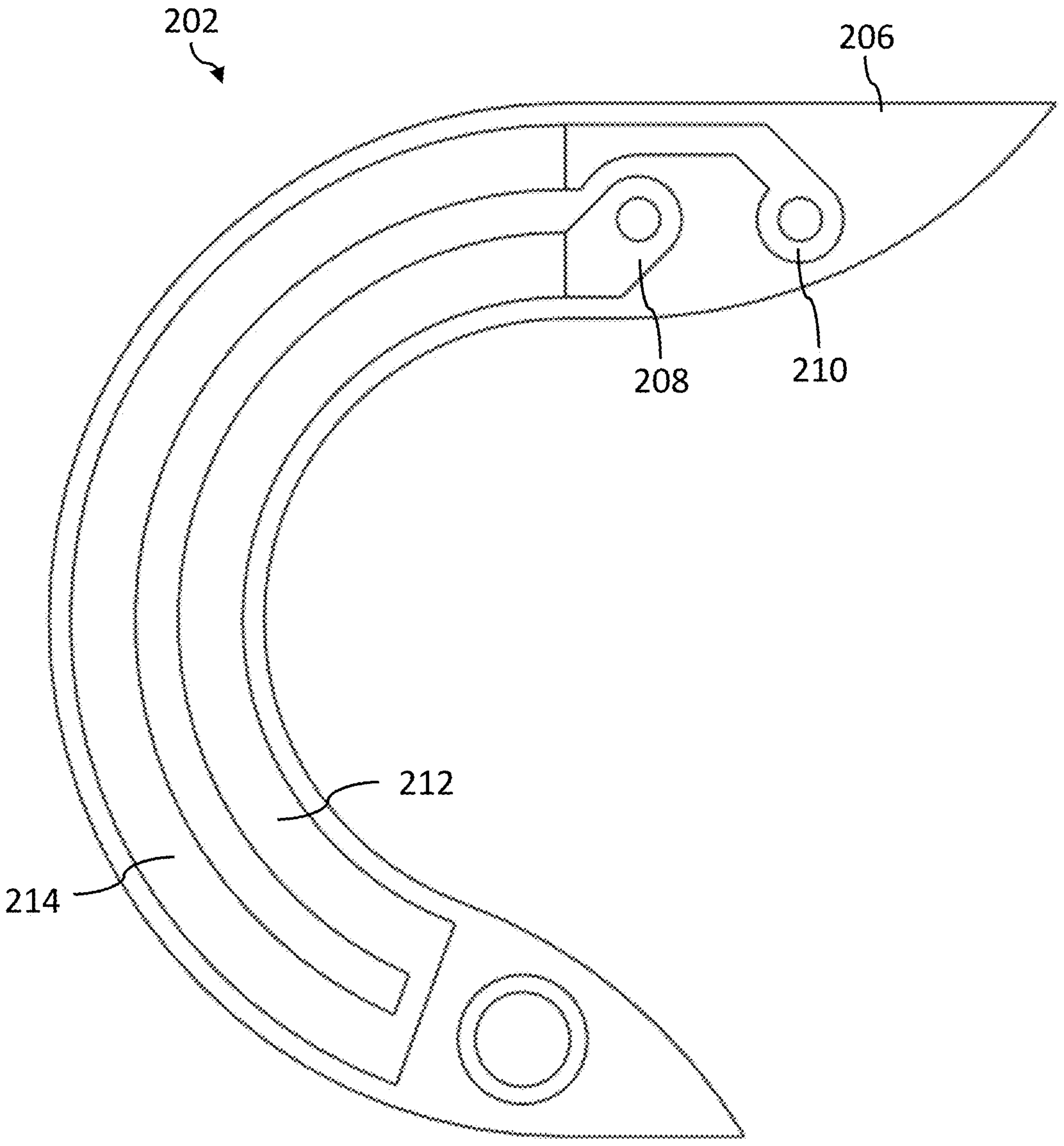
FIG. 2B is a schematic drawing of the printed circuit board (PCB) of the position transducer of FIG. 2A, in accordance with the present systems, devices, and method.

FIG. 2B is a schematic drawing of PCB 202 of position transducer 200 of FIG. 2A, in accordance with the present systems, devices, and method.

Figure 3A:
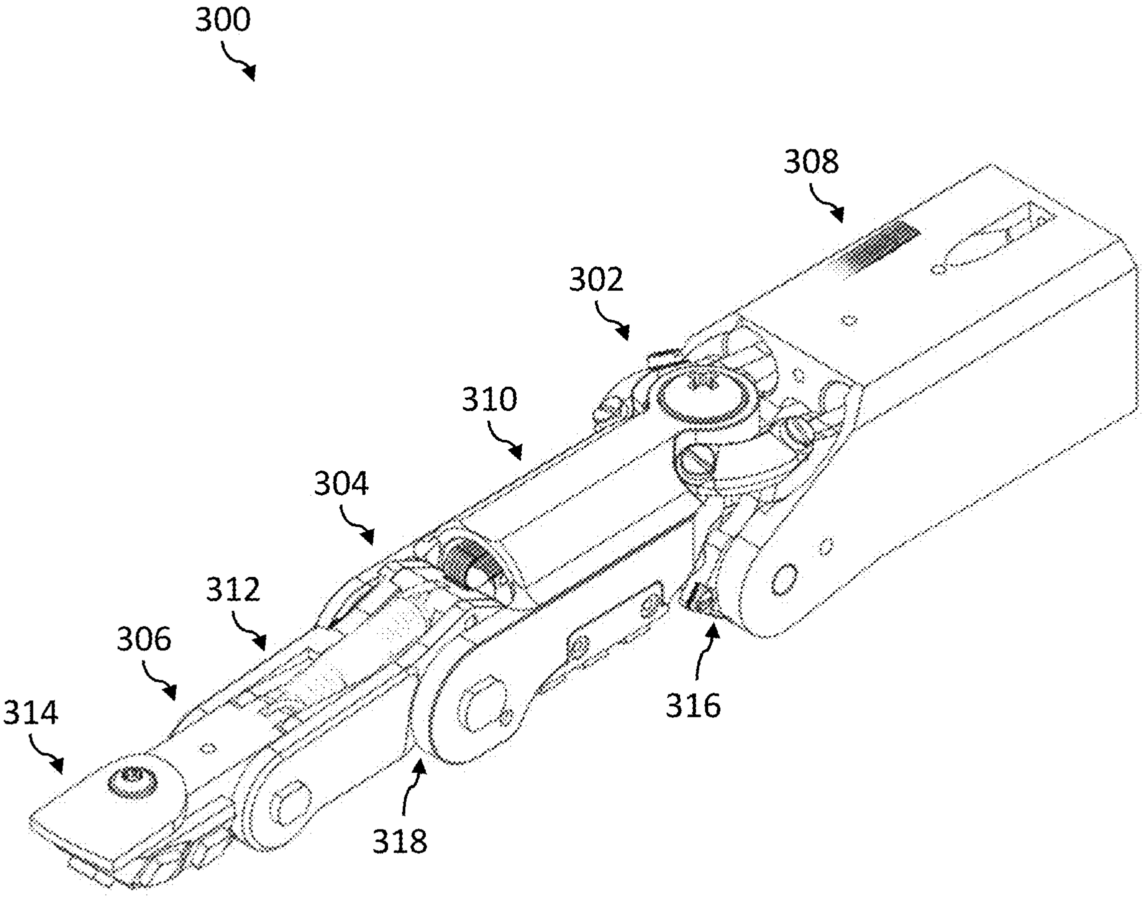
FIG. 3A is a schematic drawing of an example implementation of a robotic digit shown from above, in accordance with the present systems, devices, and methods.

FIG. 3A is a schematic drawing of an example implementation of a robotic digit 300 shown from above, in accordance with the present systems, devices, and methods. Digit 300 is analogous to a human finger, therefore digit 300 is described below in terms that can be used to describe the anatomy of a humanoid digit (e.g., a thumb or a finger).

Digit 300 includes a metacarpophalangeal (MCP) joint 302, a proximal interphalangeal (PIP) joint 304, and a distal interphalangeal (DIP) joint 306. MCP joint 302 joins a metacarpal 308 and a proximal phalange 310. PIP joint 304 joins proximal phalange 310 and a middle phalange 312. DIP joint 306 joins middle phalange 312 and a distal phalange 314.

Digit 300 includes a position transducer 316 on a left-hand side of MCP 302, and a position transducer 318 on a left-hand side of PIP 304. In some implementations, digit 300 includes a position transducer (not shown in FIG. 3A) at DIP 306.

In some implementations, position transducers (e.g., position transducer 100 of FIG. 1A) are integrated with an elbow, a knee, a pivot joint, or another suitable joint.

Position transducer 316 is operable to determine a relative orientation of metacarpal 308 and proximal phalange 310. The relative orientation of metacarpal 308 and proximal phalange 310 may include an angle of pitch (up/down) between metacarpal 308 and proximal phalange 310.

Similarly, position transducer 318 is operable to determine a relative orientation of proximal phalange 310 and middle phalange 312. The relative orientation of proximal phalange 310 and middle phalange 312 may include an angle of pitch between proximal phalange 310 and middle phalange 312.

Each of position transducers 316 and 318 may send a respective signal to a controller (not shown in FIG. 3B) where each signal includes the respective relative orientation described above. Each signal may be part of a respective feedback loop used to control a movement of digit 300.

Figure 3B:
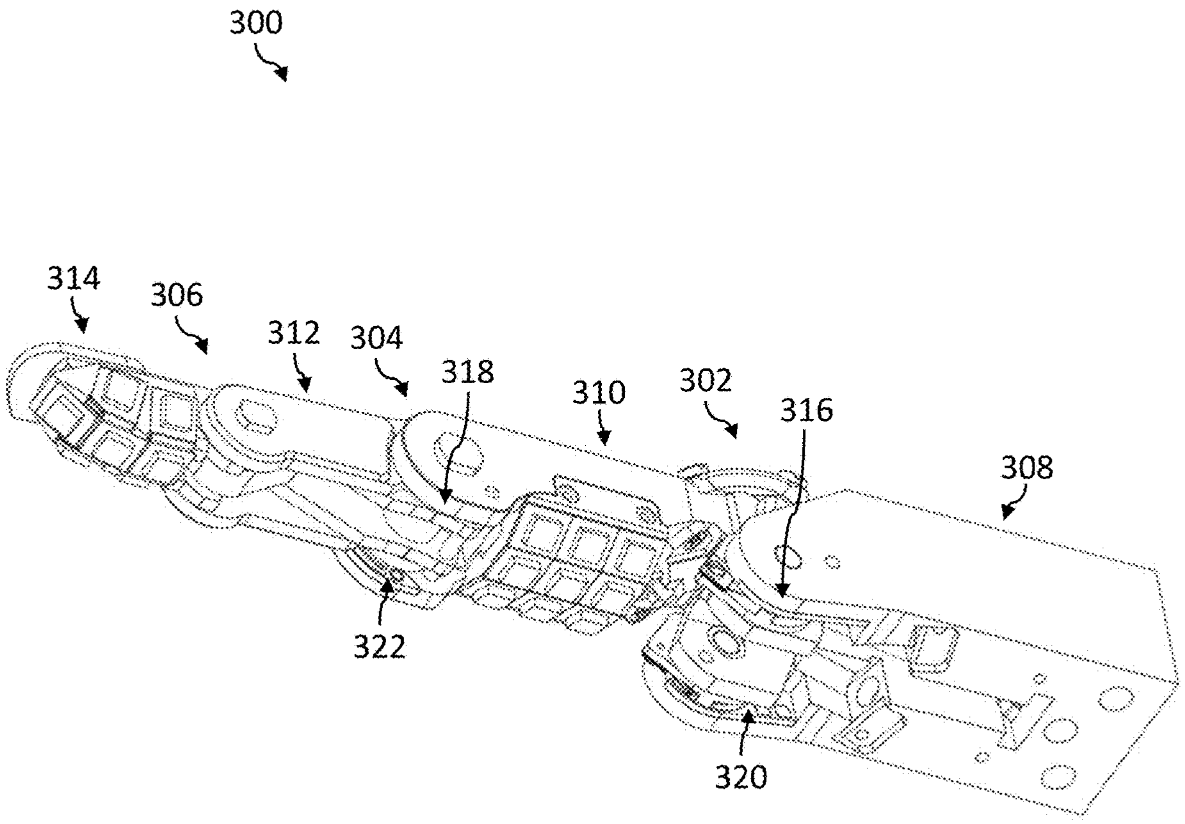
FIG. 3B is a schematic drawing of the robotic digit of FIG. 3A shown from below, in accordance with the present systems, devices, and methods.

FIG. 3B is a schematic drawing of robotic digit 300 of FIG. 3A shown from below, in accordance with the present systems, devices, and methods. As well as the elements described above with reference to FIG. 3A, digit 300 also includes a position transducer 320 on a right-hand side of MCP 302, and a position transducer 322 on a right-hand side of PIP 304.

Each of MCP joint 302 and PIP joint 304 of digit 300 can be actuated by a respective two actuators. Each actuator may be an actuation piston of a hydraulic system, for example.

Operation of the two actuators at each of MCP joint 302 and PIP joint 304 may be coordinated to control a respective movement of digit 300.

Movement of digit 300 caused by the two actuators at MCP joint 302 can include a controllable change in pitch (up/down) and/or a controllable change in yaw (side-to-side) between metacarpal 308 and proximal phalange 310. The change in pitch can be caused by operating the two actuators in concert. The change in yaw can be caused by operating the two actuators differentially, or asymmetrically.

Similarly, movement of digit 300 caused by the two actuators at PIP joint 304 can include a controllable change in pitch (up/down) and/or a controllable change in yaw (side-to-side) between proximal phalange 310 and middle phalange 312. The change in pitch can be caused by operating the two actuators in concert. The change in yaw can be caused by operating the two actuators differentially, or asymmetrically.

Signals from position transducers 316 and 320 can be used to determine pitch and yaw data for MCP joint 302. In a particular operational scenario where signals from position transducers 316 and 320 are indicative of the same position or the same relative position, it can be inferred that the angle of yaw between metacarpal 308 and proximal phalange 310 is zero. In an example implementation, each of position transducers 316 and 320 is a respective position transducer 100 of FIG. 1A that includes a respective PCB 102 and wiper 104. At zero yaw, the respective PCB 102 and wiper 104 are in the same relative position in each of position transducers 316 and 320.

Similarly, signals from position transducers 318 and 322 can be used to determine pitch and yaw data for PIP joint 304. As above, where signals from position transducers 318 and 322 are indicative of the same position or the same relative position, it can be inferred that the angle of yaw between proximal phalange 310 and middle phalange 312 is zero. Also as above, in an example implementation, each of position transducers 318 and 322 is a respective position transducer 100 of FIG. 1A that includes a respective PCB 102 and wiper 104. At zero yaw, the respective PCB 102 and wiper 104 are in the same relative position in each of position transducers 318 and 322.

In some implementations, only one position transducer is integrated with PIP joint 304, for example position transducer 318. A signal from position transducer 318 can be used to determine pitch data for PIP joint 304.

In some implementations, there is pitch motion at PIP joint 304 but there is no yaw motion at PIP joint 304, i.e., there is no yaw motion between proximal phalange 310 and middle phalange 312. In these implementations, only one position transducer is used, i.e., a position transducer operable to determine pitch data. In some of these implementations, there are both pitch and yaw motions at MCP joint 302, i.e., between metacarpal 308 and proximal phalange 310. In these implementations, there are two position transducers located at MCP joint 302 (e.g., position transducers 316 and 320), and only one position transducer located at PIP joint 304 (e.g., position transducer 318).

Figure 4A:
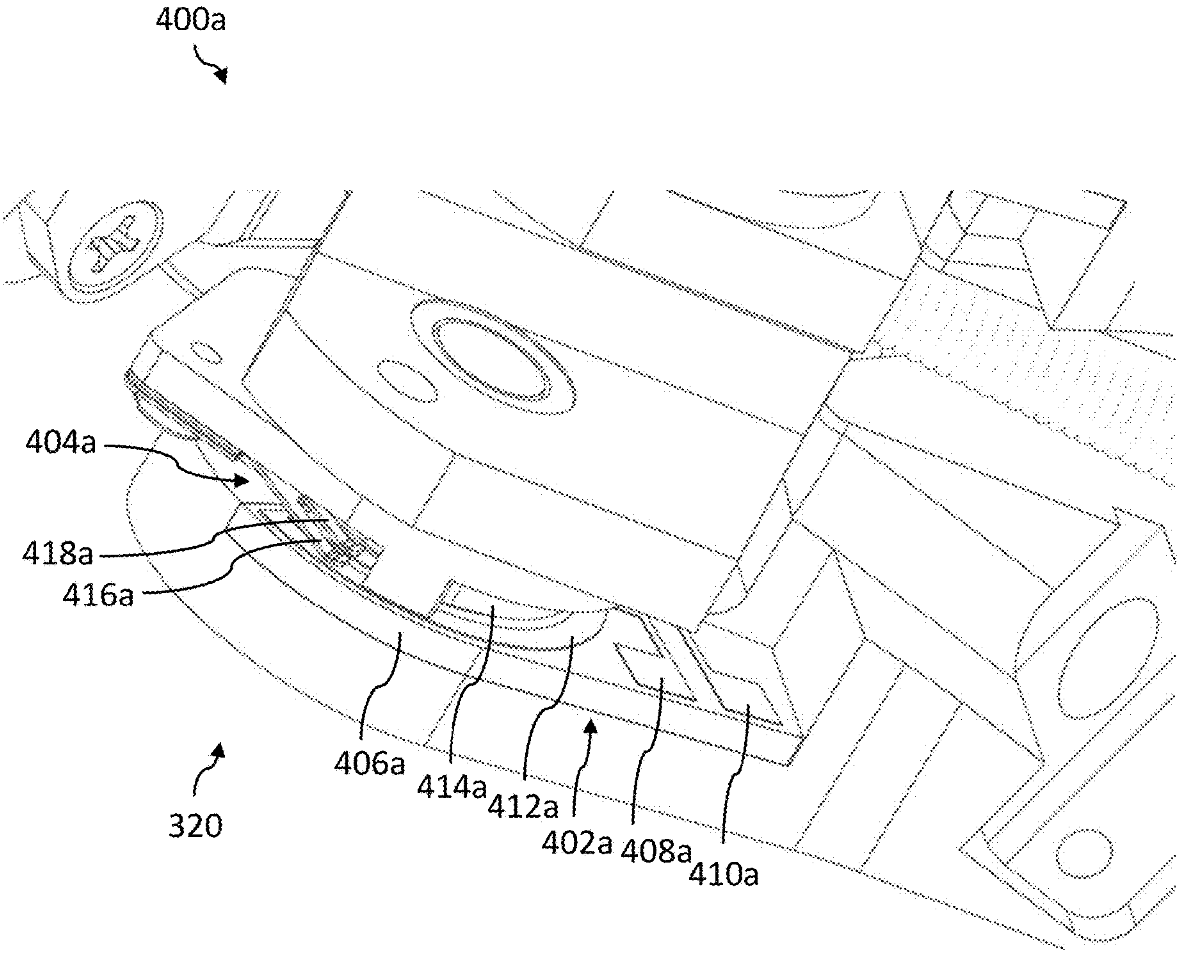
FIG. 4A is a schematic drawing of a portion of the underside of the robotic digit of FIGS. 3A and 3B showing the position transducer on the right-hand side of the metacarpophalangeal (MCP) joint, in accordance with the present systems, devices, and methods.

FIG. 4A is a schematic drawing of a portion 400*a* of the underside of robotic digit 300 of FIGS. 3A and 3B showing position transducer 320 on the right-hand side of metacarpophalangeal (MCP) joint 302, in accordance with the present systems, devices, and methods. Portion 400*a* includes a PCB 402*a* and a wiper 404*a*. PCB 402*a* includes a substrate 406*a*, connector pads 408*a* and 410*a*, and conductive traces 412*a* and 414*a*. Wiper 404*a* includes blades 416*a* and 418*a* which are slidably in contact with conductive traces 412*a* and 414*a*, respectively.

Figure 4B:
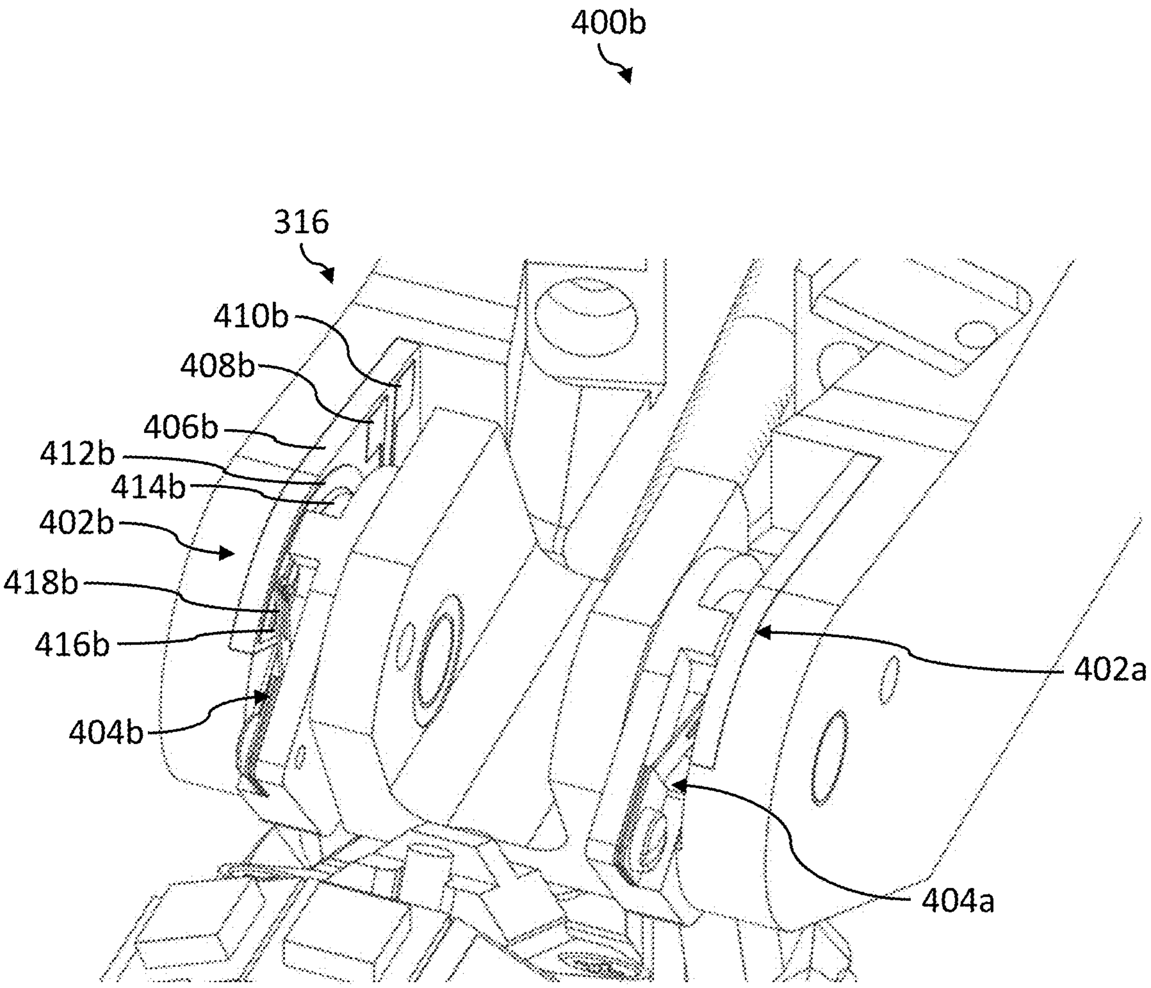
FIG. 4B is a schematic drawing of another portion of the underside of the robotic digit of FIGS. 3A and 3B showing a position transducer on a left-hand side of the metacarpophalangeal (MCP) joint, in accordance with the present systems, devices, and methods.

FIG. 4B is a schematic drawing of a portion 400*b* of the underside of robotic digit 300 of FIGS. 3A and 3B showing position transducer 320 on the right-hand side and position transducer 316 the left-hand side of MCP joint 302, in accordance with the present systems, devices, and methods. Position transducer 316 on the left-hand side includes a PCB 402*b* and a wiper 404*b*. The elements of PCB 402*b* and wiper 404*b* are similar to the elements of PCB 402*a* and wiper 404*a* described above. PCB 402*b* includes a substrate 406*b*, connector pads 408*b* and 410*b*, and conductive traces 412*b* and 414*b*. Wiper 404*b* includes blades 416*b* and 418*b* which are slidably in contact with conductive traces 412*b* and 414*b*, respectively.

Figure 5:
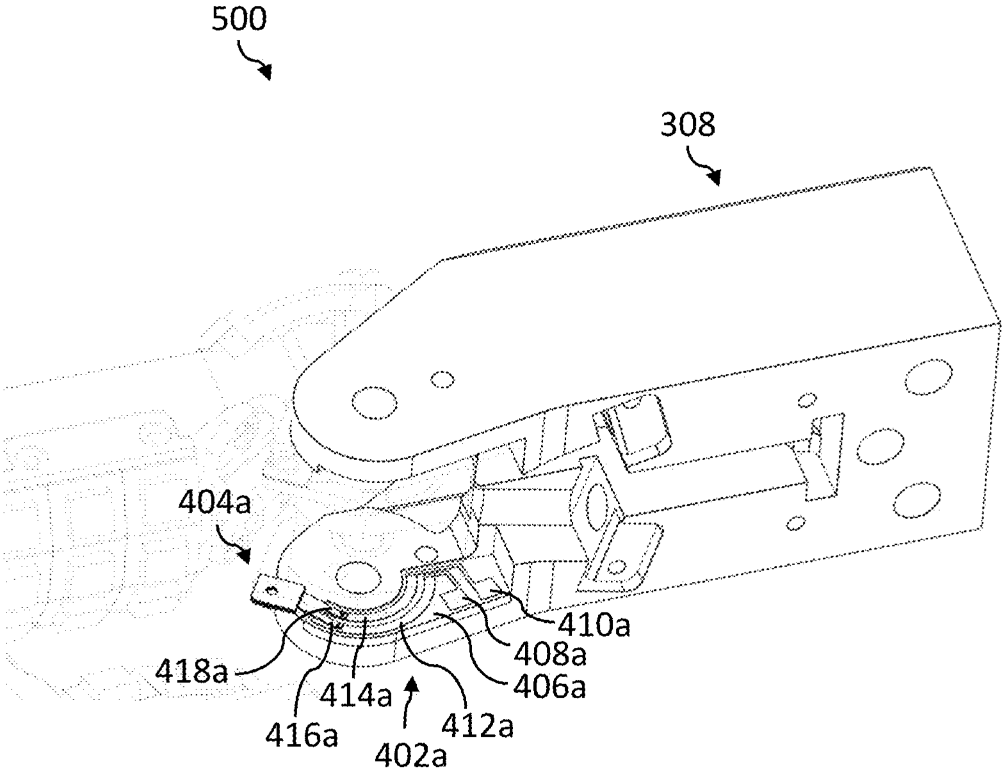
FIG. 5 is a schematic drawing of a portion of the metacarpal and the metacarpophalangeal (MCP) joint of the robotic digit of FIGS. 3A and 3B showing a position transducer on the right-hand side of the MCP joint, in accordance with the present systems, devices, and methods.

FIG. 5 is a schematic drawing of a portion 500 of metacarpal 308 and metacarpophalangeal (MCP) joint 302 of robotic digit 300 of FIGS. 3A and 3B showing position transducer 320 on the right-hand side of MCP joint 302, in accordance with the present systems, devices, and methods. Portion 500 includes metacarpal 308, PCB 402*a* and wiper 404*a*. PCB 402*a* includes substrate 406*a*, connector pads 408*a* and 410*a*, and conductive traces 412*a* and 414*a*. Wiper 404*a* includes blades 416*a* and 418*a* which are slidably in contact with conductive traces 412*a* and 414*a*, respectively.

Figure 6:
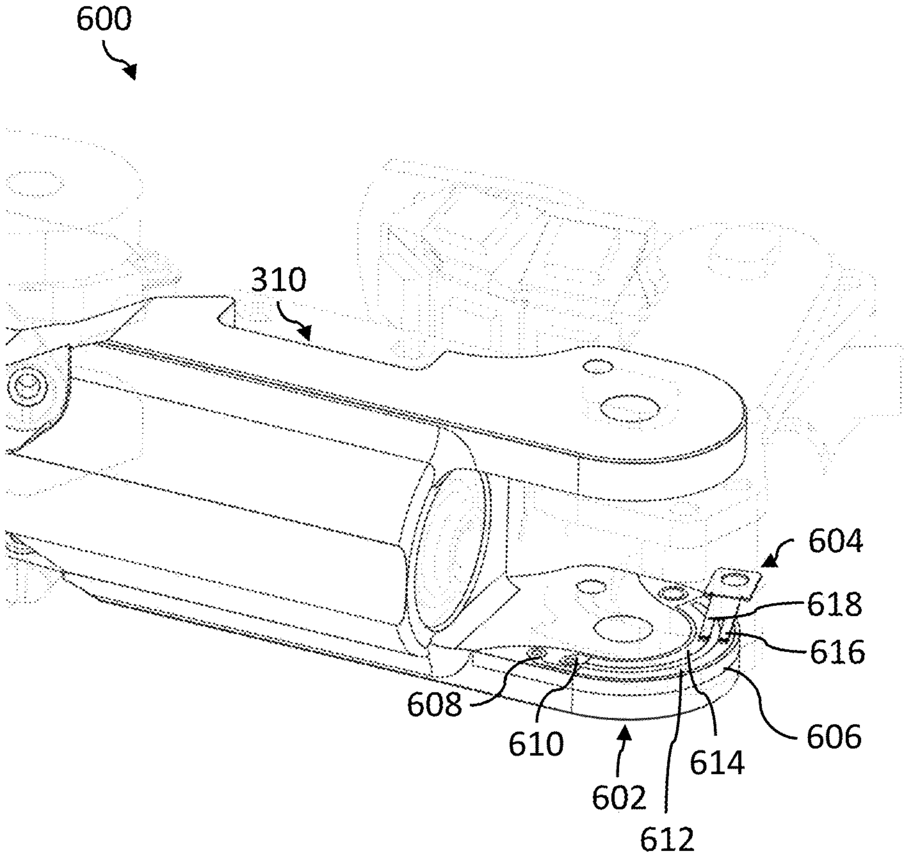
FIG. 6 is a schematic drawing of a portion of the proximal phalange and the proximal interphalangeal (PIP) joint of the robotic digit of FIGS. 3A and 3B showing a position transducer on a right-hand side of the PIP joint, in accordance with the present systems, devices, and methods.

FIG. 6 is a schematic drawing of a portion 600 of proximal phalange 310 and proximal interphalangeal (PIP) joint 304 of robotic digit 300 of FIGS. 3A and 3B showing position transducer 322 on the right-hand side of the PIP joint 304, in accordance with the present systems, devices, and methods. Portion 600 includes proximal phalange 310, a PCB 602 and a wiper 604. PCB 602 includes a substrate 606, connector pads 608 and 610, and conductive traces 612 and 614. Wiper 604 includes blades 616 and 618 which are slidably in contact with conductive traces 612 and 614, respectively.

Figure 7A:
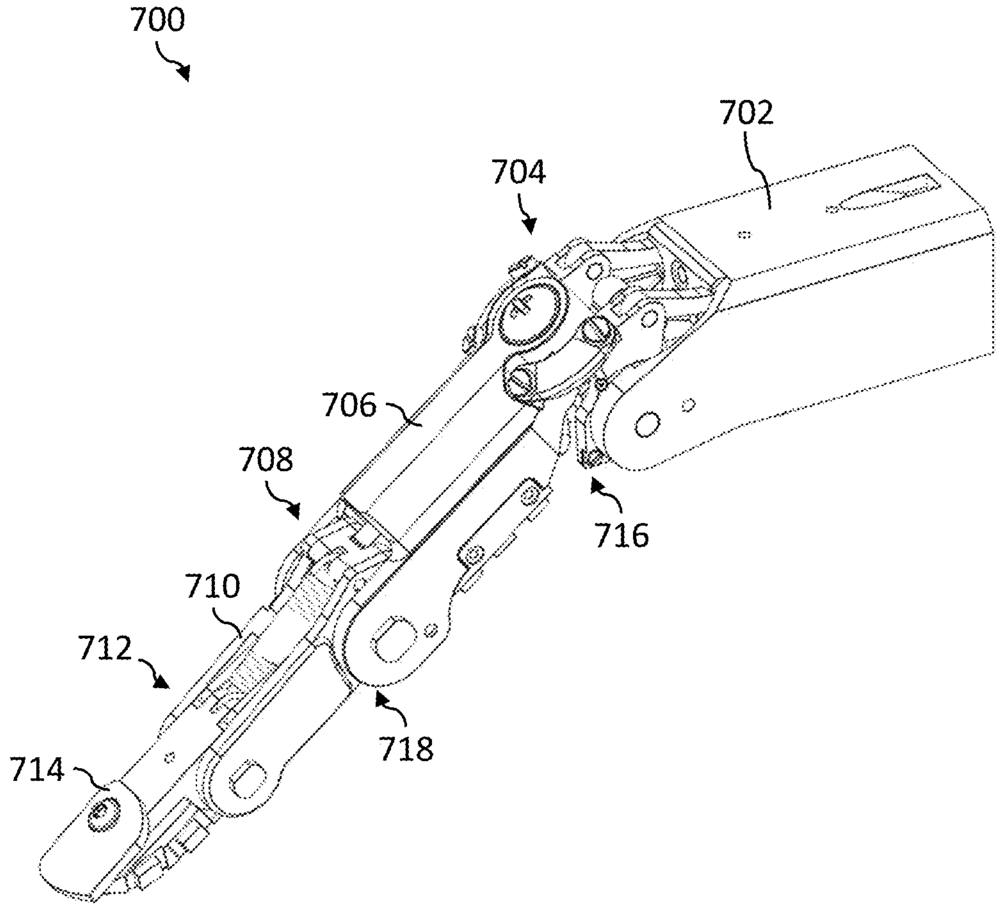
FIG. 7A is a schematic drawing of an example implementation of a robotic digit, similar to robotic digit 300 of FIGS. 3A and 3B, where the robotic digit of FIG. 7A is pointing downwards, in accordance with the present systems, devices, and methods.

FIG. 7A is a schematic drawing of an example implementation of a robotic digit 700, similar to robotic digit 300 of FIGS. 3A and 3B, where robotic digit 700 is pointing downwards, in accordance with the present systems, devices, and methods.

Robotic digit 700 includes a metacarpal 702, an MCP joint 704, a proximal phalange 706, a PIP joint 708, a middle phalange 710, a DIP joint 712, and a distal phalange. In the configuration shown in FIG. 7A, proximal, middle, and distal phalanges 706, 710, and 714, respectively, are at a downwards pitch angle relative to metacarpal 702.

Robotic digit 700 includes position transducers 716 at MCP joint 704 (only one of the position transducers 716 is visible in the view shown in FIG. 7A; the other position transducer is on the opposite side of the MCP joint 704 as shown for the position transducers 316, 320 in FIG. 3A). Robotic digit 700 also includes a position transducer 718 at PIP joint 708. Position transducers 716 can be used to determine a pitch angle between metacarpal 702 and proximal phalange 706. The pitch angle can be determined from a respective electrical path length and commensurate electrical resistance of the path in each of position transducers 716. When robotic digit 700 moves to a new pitch angle, the respective electrical path length and commensurate electrical resistance of the path in each of position transducers 716 change to new values indicative of the new pitch.

Figure 7B:
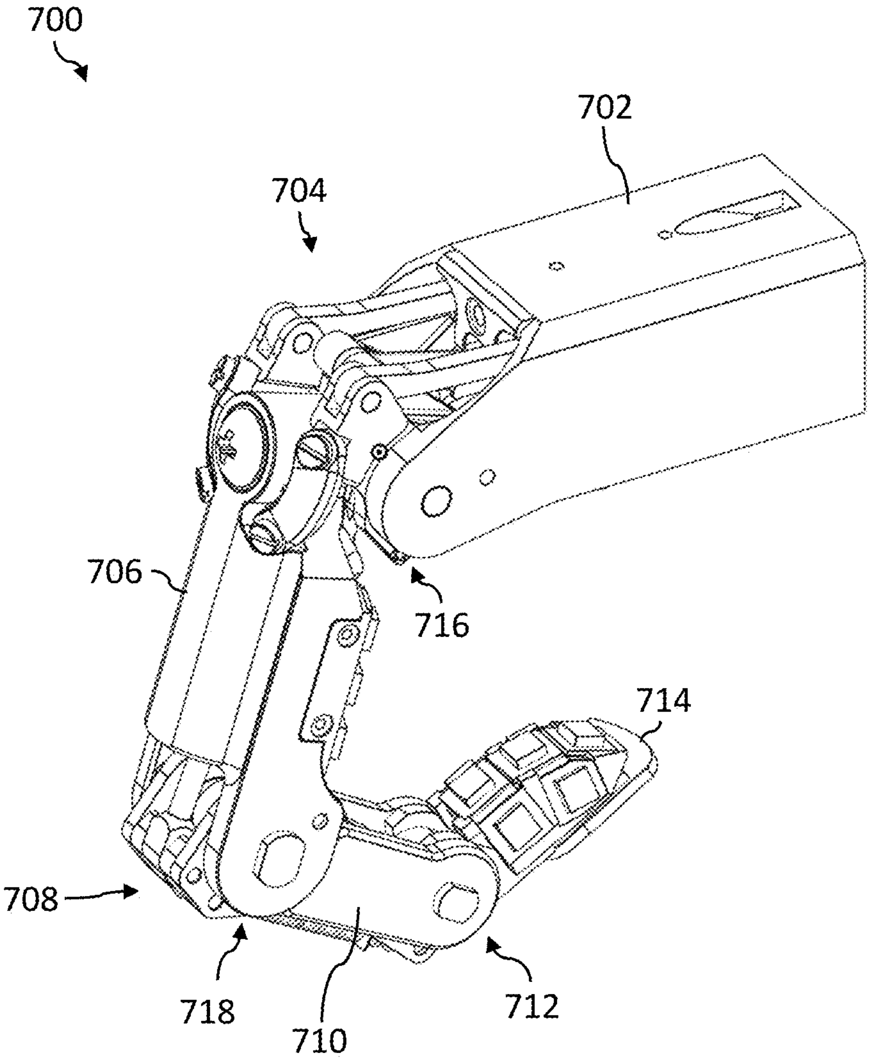
FIG. 7B is a schematic drawing of the robotic digit of FIG. 7A curled inwards, in accordance with the present systems, devices, and methods.

FIG. 7B is a schematic drawing of robotic digit 700 of FIG. 7A curled inwards, in accordance with the present systems, devices, and methods. In the configuration shown in FIG. 7B, proximal phalange 706 is at a downwards pitch angle relative to metacarpal 702, middle phalange 710 is at a downwards pitch angle relative to proximal phalange 706, and distal phalange 714 is at a downwards pitch angle relative to middle phalange 710.

As described above with reference to position transducers 716, position transducer 718 can be used to determine a pitch angle between proximal phalange 706 and middle phalange 710. The pitch angle can be determined from a respective electrical path length and commensurate electrical resistance of the path in position transducer 718. When robotic digit 700 moves to a new pitch angle, the respective electrical path length and commensurate electrical resistance of the path in position transducer 718 change to new values indicative of the new pitch.

Figure 7C:
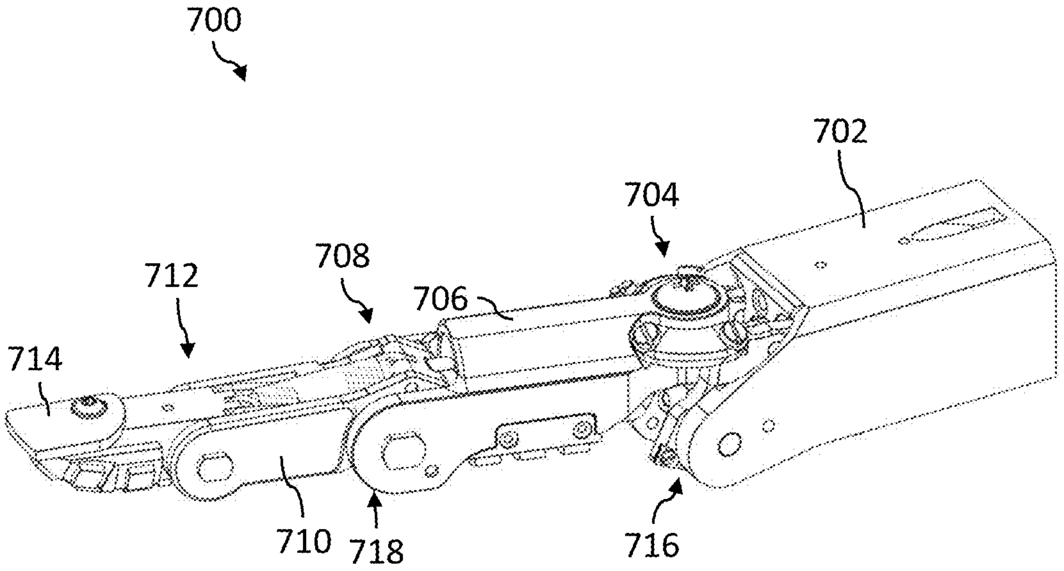
FIG. 7C is a schematic drawing of the robotic digit of FIGS. 7A and 7B pointing sideways, in accordance with the present systems, devices, and methods.

FIG. 7C is a schematic drawing of robotic digit 700 of FIGS. 7A and 7B pointing sideways, in accordance with the present systems, devices, and methods. In the configuration shown in FIG. 7C, proximal, middle, and distal phalanges 706, 710, and 714, respectively, are at a right-leaning yaw angle relative to metacarpal 702.

In addition to determining pitch data, position transducers 716 can be used to determine a yaw angle between metacarpal 702 and proximal phalange 706. The yaw angle can be determined from a respective electrical path length and commensurate electrical resistance of the path in each of position transducers 716. The yaw angle can be determined at least in part from a relative resistance (or a relative change in resistance) in the respective electrical paths in each of position transducers 716. When robotic digit 700 moves to a new yaw angle, the respective electrical path length and commensurate electrical resistance of the path in each of position transducers 716 change to new values indicative of the new yaw.

In some implementations, each of position transducers 716 is calibrated to provide a respective baseline electrical resistance $R_{01}$ and $R_{02}$ determined at a known fixed pitch and/or yaw. In some implementations, the known fixed pitch and/or yaw is zero pitch and/or zero yaw.

After robotic digit 700 has moved to a new position, each of position transducers 716 can be determined to have an electrical resistance denoted by $R_1$ and $R_2$, respectively. A respective change in resistance from the baseline can be determined for each of position transducers 716 as follows:

$$\Delta R_1 = R_1 - R_{01}, \text{ and } \Delta R_2 = R_2 - R_{02}.$$

In some implementations, a pitch angle of proximal phalange 706 relative to metacarpal 702 of robotic digit 700 can be determined, at least in part, from an average of $\Delta R_1$ and $\Delta R_2$. In some implementations, the pitch angle is proportional to the average of $\Delta R_1$ and $\Delta R_2$. In other implementations, the pitch angle is non-linearly related to the average of $\Delta R_1$ and $\Delta R_2$, and can be determined, for example, from a reference model or a look-up table for the pitch angle. A positive value of the average of $\Delta R_1$ and $\Delta R_2$ may indicate a pitch downwards, and a negative value of the average of $\Delta R_1$ and $\Delta R_2$ may indicate a pitch upwards, or vice versa.

Similarly, in some implementations, a yaw angle of proximal phalange 706 relative to metacarpal 702 of robotic digit 700 can be determined, at least in part, from a difference between $\Delta R_1$ and $\Delta R_2$, i.e., $(\Delta R_1 - \Delta R_2)$. In some implementations, the yaw angle is proportional to $(\Delta R_1 - \Delta R_2)$. In other implementations, the yaw angle is non-linearly related to $(\Delta R_1 - \Delta R_2)$, and can be determined, for example, from a reference model or a look-up table for the yaw. A positive value of $(\Delta R_1 - \Delta R_2)$ may indicate a yaw to the right, and a negative value of $(\Delta R_1 - \Delta R_2)$ may indicate a yaw to the left, or vice versa.

Calibration of position transducers 716 may be performed before and/or after installation of each of position transducers 716 in robotic digit 700. Calibration may include determining an electrical resistance at multiple different pitch and yaw angles and/or at multiple different relative positions of a wiper and a conductive trace (for example, wiper 104 and conductive trace 112 of position transducer 100 of FIG. 1A).

Other suitable methods may be used to extract the pitch and yaw angles from signals output by position transducers 716, alone or in combination.

Figure 8:
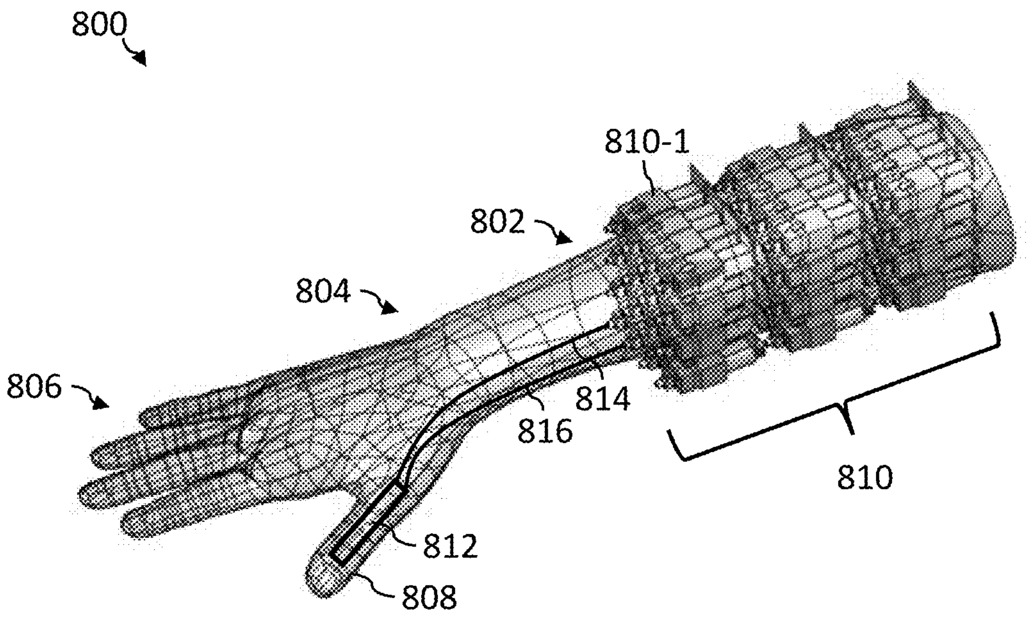
FIG. 8 is a schematic drawing of an example implementation of a portion of a hydraulic system in a forearm, wrist, and hand of a robot, in accordance with the present systems, devices, and methods.

FIG. 8 is a schematic drawing of an example implementation of a portion 900 of a hydraulic system in a forearm 802, wrist 804, and hand 806 of a robot (e.g., robot 900 of FIG. 9), in accordance with the present systems, devices, and methods. Hand 806 includes a robotic digit 808.

Forearm 802 includes a set of valves 810 which is integrated with forearm 802. Valves 810 include valve 810-1. (Only one valve is separately labeled for clarity of illustration.) Valves 810 may include pressure valves and exhaust valves. Valves 810 may include electrohydraulic servo valves, and may be operated by a controller (not shown in FIG. 8).

Digit 808 includes an actuation piston 812 integrated with digit 808. Actuation piston 812 is hydraulically coupled to valves 810 via a pressure hose 814 and an exhaust hose 816.

In some implementations, digit 808 may include multiple actuators. Some actuators may be used to control movement of joints in digit 808. For example, actuators may be used to control movement of one or more knuckle joints.

Digit 808 may include one or more knuckle joints. For example, digit 808 may include one or more of a metacarpophalangeal (MCP) joint, a proximal interphalangeal (PIP) joint, and a distal interphalangeal (DIP) joint. Digit 808 may include one or more position transducers described above (for example, position transducer 100 of FIG. 1).

Figure 9:
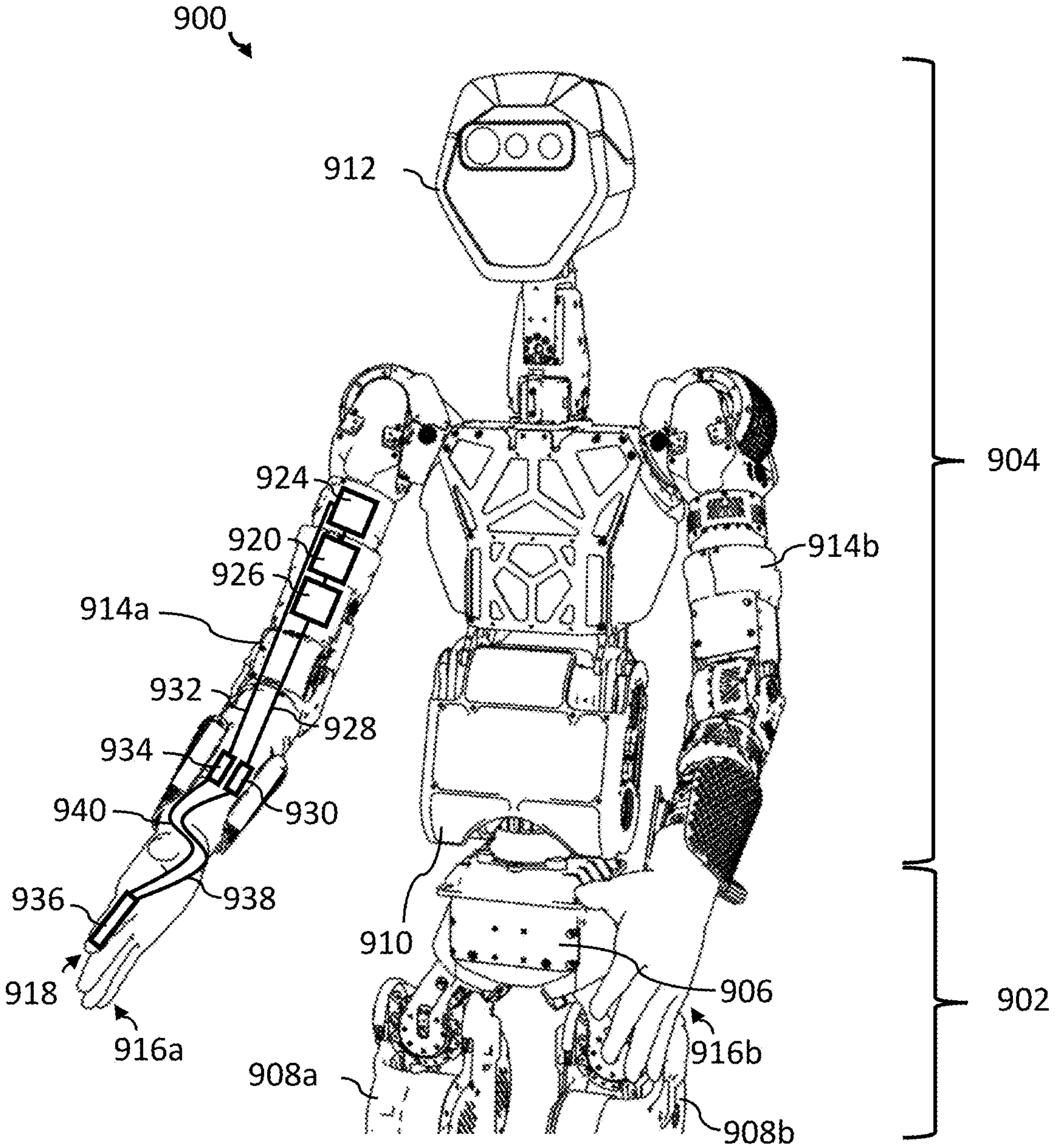
FIG. 9 is a schematic drawing of an example implementation of a hydraulically-powered robot, in accordance with the present systems, devices, and methods.

FIG. 9 is a schematic drawing of an example implementation of a robot 900, in accordance with the present systems, devices, and methods. Robot 900 comprises a base 902 and a humanoid upper body 904. Base 902 comprises a pelvic region 906 and two legs **908*a* and 908*b* (collectively referred to as legs 908). Only the upper portion of legs 908 is shown in FIG. 9. In other example implementations, base 902** may comprise a stand and (optionally) one or more wheels.

Upper body 904 comprises a torso 910, a head 912, right-side arm **914*a* and a left-side arm 914*b* (collectively referred to as arms 914), and a right hand 916*a* and a left hand 916*b* (collectively referred to as hands 916). Arms 914 of robot 900 are also referred to in the present application as robotic arms. Arms 914 of robot 900 are humanoid arms. In other implementations, arms 914** have a form factor that is different from a form factor of a humanoid arm.

Hands 916 are also referred to in the present application as end effectors. In other implementations, hands 916 have a form factor that is different from a form factor of a humanoid hand. Each of hands 916 comprises one or more digits, for example, digit 918 of hand **916*a***. Digits may include fingers, thumbs, or similar structures of the hand or end effector.

Robot 900 is a hydraulically-powered robot. In other implementations, robot 900 has alternative or additional power systems. In some implementations, base 902 and/or torso 910 of upper body 904 house a hydraulic control system, for example. In some implementations, components of the hydraulic control system may alternatively be located outside the robot, e.g., on a wheeled unit that rolls with the robot as it moves around, or in a fixed station to which the robot is tethered.

The hydraulic control system of robot 900 comprises a hydraulic pump 922, a reservoir 924, and an accumulator 926, housed in arm 914*a*. Hose 928 provides a hydraulic coupling between accumulator 926 and a pressure valve 930 of the hydraulic control system. Hose 932 provides a hydraulic coupling between an exhaust valve 934 of the hydraulic control system and reservoir 924.

Pressure valve 930 is hydraulically coupled to an actuation piston 936 by a hose 938. Actuation piston 936 is hydraulically coupled to exhaust valve 934 by a hose 940. Hoses 928 and 938, and pressure valve 930, provide a forward path to actuation piston 936. Hoses 932 and 940, and exhaust valve 934 provide a return path to actuation piston 936. Pressure valve 930 and exhaust valve 934 can control actuation piston 936, and can cause actuation piston 936 to move, which can cause a corresponding motion of at least a portion of hand 916*a*, for example, digit 918.

Each of hands 916 may have more than one degree of freedom (DOF). In some implementations, each hand has up to eighteen (18) DOFs. Each DOF can be driven by a respective actuation piston (for example, actuation piston 936). For clarity of illustration, only one actuation piston is shown in FIG. 9. Each actuation piston may be located in hands 916.

In some implementations, digit 918 may include multiple actuators. Some actuators may be used to control movement of joints in digit 918. For example, actuators may be used to control movement of one or more knuckle joints.

Digit 918 may include one or more knuckle joints. For example, digit 918 may include one or more of a metacarpophalangeal (MCP) joint, a proximal interphalangeal (PIP) joint, and a distal interphalangeal (DIP) joint. Digit 918 may include one or more position transducers described above (for example, position transducer 100 of FIG. 1). The position transducers may provide positional data for robot 900 to be self-aware of a position of one or more components of digit 918 with respect to each other, and/or to provide control of digit 918.

The various implementations described herein may include, or be combined with, any or all of the systems, devices, and methods described in U.S. patent application Ser. No. 17/491,577, U.S. patent application Ser. No. 17/491,583, U.S. patent application Ser. No. 17/491,586, and U.S. Provisional Patent Application Ser. No. 63/191,732, all of which are incorporated herein by reference in their entirety.

Throughout this specification and the appended claims, infinitive verb forms are often used. Examples include, without limitation: "to provide," "to control," and the like. Unless the specific context requires otherwise, such infinitive verb forms are used in an open, inclusive sense, that is as "to, at least, provide," "to, at least, control," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of robotic systems and hydraulic circuits provided.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A robotic digit comprising:

a first digit segment;

a second digit segment;

a first joint pivotably coupling the first digit segment to the second digit segment; and a first position transducer disposed on a first side of the first joint, the first position transducer comprising:

a first printed circuit board (PCB), the first PCB comprising:

a first connector pad;

a second connector pad; and a first conductive trace comprising a first leg and a second leg, the first leg having a first end, the first end electrically communicatively coupled to the first connector pad, and the second leg having a second end, the second end electrically communicatively coupled to the second connector pad; and a first wiper in sliding contact with the first PCB, the first wiper comprising a first blade and a second blade, the first blade electrically communicatively coupled to the first leg of the first conductive trace, and the second blade electrically communicatively coupled to the second leg of the first conductive trace, wherein, in operation, a first electrical path length of a first conductive path between the first connector pad and the second connector pad depends, at least in part, on a relative position of the first PCB and the first wiper;

wherein the first blade and the second blade slide respectively along the first leg of the first conductive trace and the second leg of the first conductive trace when the first digit segment and the second digit segment pivot relative to each other at the first joint.

2. The robotic digit of claim 1, wherein the first leg of the first conductive trace includes a first portion, the first portion which electrically communicatively couples the first connector pad to the first blade; and the second leg of the first conductive trace includes a second portion, the second portion which electrically communicatively couples the second connector pad to the second blade, wherein the first connector pad, the first portion of the first conductive trace, the first blade, the second blade, the second portion of the first conductive trace, and the second connector pad form the first conductive path.

3. The robotic digit of claim 1, wherein at least a portion of the second leg of the first conductive trace is substantially parallel with at least a portion of the first leg of the first conductive trace.

4. The robotic digit of claim 1, wherein at least a portion of the first leg of the first conductive trace is a first curve and at least a portion of the second leg of the first conductive trace is a second curve.

5. The robotic digit of claim 4, wherein the second curve is substantially parallel to the first curve.

6. The robotic digit of claim 1, further comprising at least one spring, wherein the at least one spring urges the first blade towards the first leg of the first conductive trace and the second blade towards the second leg of the first conductive trace.

7. The robotic digit of claim 1, further comprising:

an electrical source electrically communicatively coupled to the first and the second connector pad;

a meter electrically communicatively coupled to the first and the second connector pad, the meter which, in operation, determines the electrical path length of the first conductive path; and a transmitter which, in operation, transmits the relative position of the first PCB and the first wiper to a controller.

8. The robotic digit of claim 7, wherein the meter, in operation, determines the electrical path length of the first conductive path based at least in part on an electrical resistance of the first conductive path.

9. The robotic digit of claim 1, wherein the robotic digit is a robotic finger of a robotic hand of a humanoid robot.

10. The robotic digit of claim 1, wherein the first joint is a knuckle joint.

11. The robotic digit of claim 1, wherein the relative position of the first PCB and the first wiper includes an angle defining a pitch rotation of the second digit segment relative to the first digit segment.

12. The robotic digit of claim 1, further comprising a second position transducer disposed on a second side of the first joint, the second position transducer comprising:

a second printed circuit board (PCB), the second PCB comprising:

a third connector pad;

a fourth connector pad; and a second conductive trace comprising a third leg and a fourth leg, the third leg having a third end, the third end electrically communicatively coupled to the third connector pad, and the fourth leg having a fourth end, the fourth end electrically communicatively coupled to the fourth connector pad; and a second wiper in sliding contact with the second PCB, the second wiper comprising a third blade and a fourth blade, the third blade electrically communicatively coupled to the third leg of the second conductive trace, and the fourth blade electrically communicatively coupled to the fourth leg of the second conductive trace, wherein, in operation, a second electrical path length of a second conductive path between the third connector pad and the fourth connector pad depends, at least in part, on a relative position of the second PCB and the second wiper;

wherein the third blade and the fourth blade slide respectively along the third leg of the second conductive trace and the fourth leg of the second conductive trace when the first digit segment and the second digit segment pivot relative to each other at the first joint.

13. The robotic digit of claim 12, wherein the relative position of the first PCB and the first wiper, and the relative position of the second PCB and the second wiper, include a first angle defining a pitch rotation of the second digit segment relative to the first digit segment, and a second angle defining a yaw rotation of the second digit segment relative to the first digit segment.

14. The robotic digit of claim 1, further comprising:

a third digit segment;

a second joint pivotably coupling the third digit segment to the second digit segment; and a second position transducer disposed on a first side of the second joint, the second position transducer comprising:

a second printed circuit board (PCB), the second PCB comprising:

a third connector pad;

a fourth connector pad; and a second conductive trace comprising a third leg and a fourth leg, the third leg having a third end, the third end electrically communicatively coupled to the third connector pad, and the fourth leg having a fourth end, the fourth end electrically communicatively coupled to the fourth connector pad; and a second wiper in sliding contact with the second PCB, the second wiper comprising a third blade and a fourth blade, the third blade electrically communicatively coupled to the third leg of the second conductive trace, and the fourth blade electrically communicatively coupled to the fourth leg of the second conductive trace, wherein, in operation, a second electrical path length of a second conductive path between the third connector pad and the fourth connector pad depends, at least in part, on a relative position of the second PCB and the second wiper;

wherein the third blade and the fourth blade slide respectively along the third conductive leg and the fourth conductive leg when the second digit segment and the third digit segment pivot relative to each other at the second joint.

15. The robotic digit of claim 14, wherein the relative position of the second PCB and the second wiper includes an angle defining a pitch rotation of the third digit segment relative to the second digit segment.

16. The robotic digit of claim 14, wherein the third leg of the second conductive trace includes a third portion, the third portion which electrically communicatively couples the third connector pad to the third blade; and the fourth leg of the second conductive trace includes a fourth portion, the fourth portion which electrically communicatively couples the fourth connector pad to the fourth blade, wherein the third connector pad, the third portion of the second conductive trace, the third blade, the fourth blade, the fourth portion of the second conductive trace, and the fourth connector pad form the second conductive path.

17. The robotic digit of claim 14, wherein at least a portion of the fourth leg of the second conductive trace is substantially parallel to at least a portion of the third Leg of the second conductive trace.

18. The robotic digit of claim 14, wherein at least a portion of the third leg of the second conductive trace is a first curve and at least a portion of the fourth leg of the second conductive trace is a second curve.

19. The robotic digit of claim 18, wherein the second curve is substantially parallel to the first curve.

20. The robotic digit of claim 1, wherein the first conductive trace is a U-shaped conductive trace.

* * * * *